Figure 1:
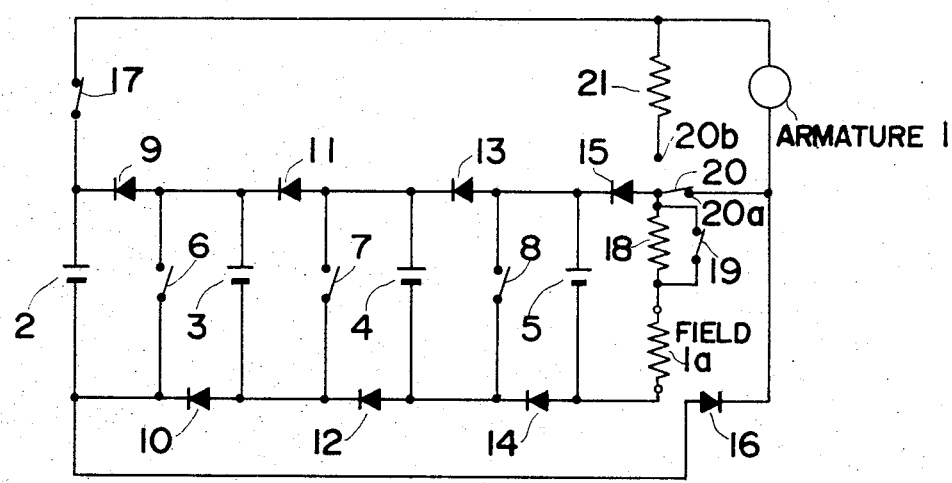
Figure 2A:
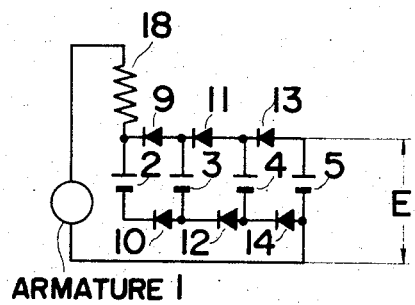
Figure 2B:
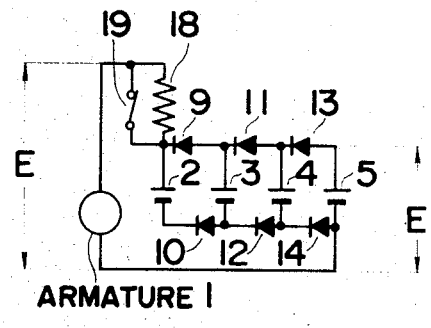
Figure 2C:
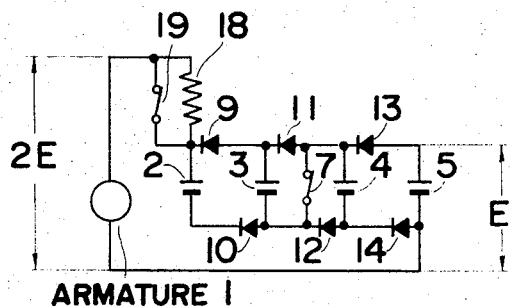
Figure 2D:
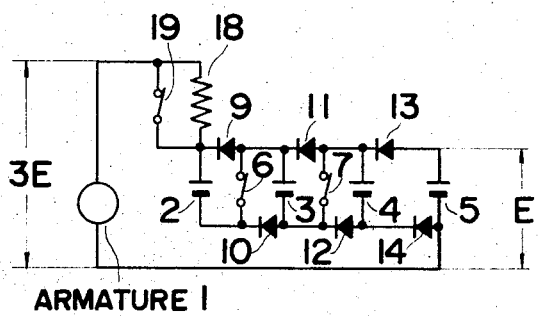
Figure 2E:
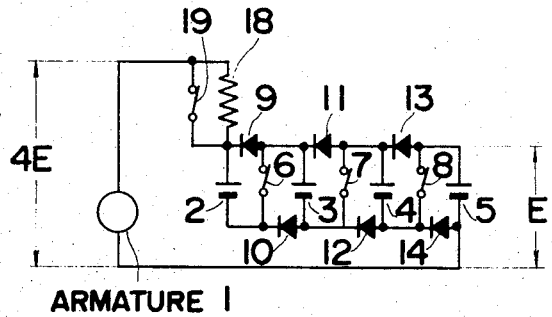

United States Patent [19]
Minami

[11] 3,728,599
[45] Apr. 17, 1973

[54] CONTROL SYSTEM FOR AN ELECTRIC AUTOMOTIVE VEHICLE

[75] Inventor: Hirosi Minami, Kawasaki-shi, Japan

[73] Assignees: Toyo Kogyo Co., Ltd., Hiroshima-ken; Fuji Electric Co., Ltd., Kawasaki-shi, Kanagawa-ken, Japan

[22] Filed: July 30, 1971

[21] Appl. No.: 167,569

[52] U.S. Cl. ............... 318/139, 318/269, 318/376
[51] Int. Cl. .................................................. H02p 7/14
[58] Field of Search ............... 318/139, 375–382, 318/269

[56] References Cited

UNITED STATES PATENTS

| | | | |
|---|---|---|---|
| 3,387,194 | 6/1968 | Banks | 318/139 |
| 3,325,714 | 6/1967 | Torii | 318/376 |
| 3,280,397 | 10/1966 | Bruns | 318/139 |
| 3,530,356 | 9/1970 | Aronson | 318/139 |
| 3,207,966 | 9/1965 | Parkinson | 318/139 |
| 3,264,540 | 8/1966 | Dannettell | 318/139 |

*Primary Examiner*—Bernard A. Gilheany
*Assistant Examiner*—Thomas Langer
*Attorney*—Craig, Antonelli & Hill

[57] ABSTRACT

A control system for an electric automotive vehicle driven by a battery operated D.C. series motor, comprising a motor control circuit for controlling stepwisely D.C. voltage applied to a motor to regulate the speed of the motor and control means for charging batteries during regenerative braking operation of the vehicle. The motor control circuit is constituted of four batteries, six unidirectional devices and three switching means.

3 Claims, 12 Drawing Figures

INVENTOR
HIROSI MINAMI
BY Craig, Antonelli + Hill
ATTORNEYS

CONTROL SYSTEM FOR AN ELECTRIC AUTOMOTIVE VEHICLE

The present invention relates to a control system for an electric automotive vehicle driven by a battery operated D.C. series motor and, more particularly, to a motor control system including a motor control circuit for controlling stepwisely the applied D.C. voltage to a series motor thereby to regulate the speed of the motor and a control means for charging batteries by regenerative braking operation utilizing the speed control circuit during deceleration of the vehicle.

Various control systems for controlling the speed of battery operated D.C. series motors have heretofore been proposed and employed in electric automotive vehicles. These conventional systems are classified as 1) a resistance control system, wherein the vehicle speed control is effected by changing the resistance value of resistors inserted in the motor circuit, 2) a battery switching system wherein the vehicle speed control is effected by switching the connection of a plurality of batteries in series or in parallel with each other, thereby to regulate voltage applied to the motor, and 3) a chopper control system wherein the vehicle speed control is effected by inserting a thyristor- chopper circuit in the motor circuit, to intermittently cut off the battery voltage to thereby change the average current supplied to the motor.

However, the resistance control system has the disadvantage in that it has extremely large resistance losses, resulting in substantial heat which must be dissipated. Accordingly, it is uneconomical and inefficient to employ in a battery operated electric automotive vehicle in which the stored electric energy is limited. Similarly, while the chopper control system has advantages in that the average current supplied to the motor can be varied continuously, circuit-losses can be kept small and efficiency is high, it has a disadvantage of being expensive.

Accordingly, the battery switching system is preferable as an intermediary system of the above two systems. This system requires mechanical contactors which switch the connection of batteries in series or in parallel with each other and also necessitates stepwise voltages in relatively small steps in order to provide smoothness of speed regulation. In order to decrease the number of contacts or mechanical change over contactors required for switching the connection, uni-directional devices for preventing back currents are used in combination with contactors.

In U.S. Pat. No. 3,264,540, a system for connecting two batteries in series or in parallel with each other has been disclosed. However, in this system it is impossible to provide the smoothness of speed regulation, since the applied voltage can be changed only in two steps. Similarly, in the U.S. Pat. No. 3,207,966, a system for changing the connection of four batteries in series or in parallel has been disclosed. Although it is possible to change the applied voltage in three steps in this system, it is impossible to change it in four steps as occasion demands. Further, in this circuit, it is impossible to charge the batteries when connected in parallel with each other during regenerative braking operation.

On the other hand, it has been proposed to perform regenerative braking or dynamic braking of the motor for deceleration of an electric automotive vehicle. Since dynamic braking is performed by converting mechanical energy into electric power and consuming the electric power as resistance losses, it is not preferable to perform dynamic braking when the vehicle is running at a high speed. Therefore, regenerative braking is usually performed when the vehicle is running at a high speed. Regenerative braking is performed by charging batteries with electric power converted from mechanical energy. However, there is the possibility of destroying the batteries in the case where batteries are charged with extremely high voltage. Therefore, it is necessary to provide an expensive voltage regulator for charging the batteries.

Further, since a D.C. series motor is employed in an electric automotive vehicle, it is necessary to reverse the series field winding of the motor when the vehicle is to be decelerated. For reversing the field winding during deceleration, an increased number of mechanical contactors are required.

Accordingly, one object of the present invention is to provide a control system for a battery operated motor for an electric automotive vehicle which is simple in circuit construction, easy to operate, and has low resistance losses.

Another object of the present invention is to provide a control circuit for a battery operated motor for an automotive vehicle which is constructed of a new combination of four batteries, six uni-directional devices and three switching means. batteries, regardless A further object of the present invention is to provide an improved control circuit for using all batteries equally. In addition, one essential feature of the present invention resides in the fact that, since six uni-directional devices have fundamentally the same resistance characteristic in order to prevent unequal discharge of the batteries, the four battery circuits are balanced substantially regardless of each battery load.

A further object of the present invention is to provide a control circuit capable of charging all four batteries connected together in parallel during regenerative braking.

A further object of the present invention is to provide a simple control circuit at low cost which is very satisfactory, both from the viewpoint of smoothness of speed regulation and from the viewpoint of efficiency.

A further object of the present invention is to provide a control means capable of changing over from normal running operation to regenerative braking by using a reduced number of change-over contactors.

A further object of the present invention is to provide a control means which charges the batteries with a low voltage and thereby performs regenerative braking over a wide range of the motor speed by providing the motor with the characteristic of a separately excited shunt D.C. motor.

A further object of the present invention is to provide a control means which is designed so as to smoothly perform a braking operation when the vehicle is transferred to a decelerating operation from a normal running operation and prevent the braking force from abnormally increasing in response to the speed of the motor.

A still further object of the present invention is to diminish or lessen the number of contactors or switches for changing over the operation of a D.C. motor.

A further object of the present invention is to prevent, at an earlier period during the deceleration operation for a D.C. motor, the induction of an unnecessarily large electromotive force for charging the batteries.

Figure 3:
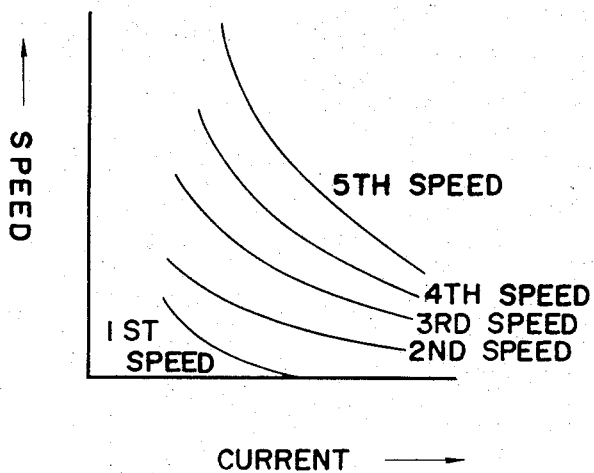
Figure 4:
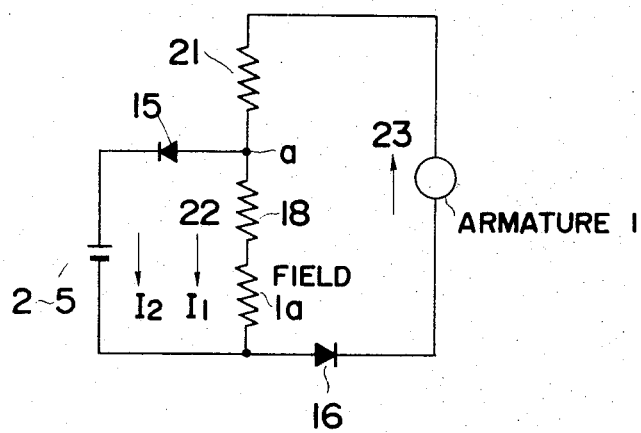
Figure 5:
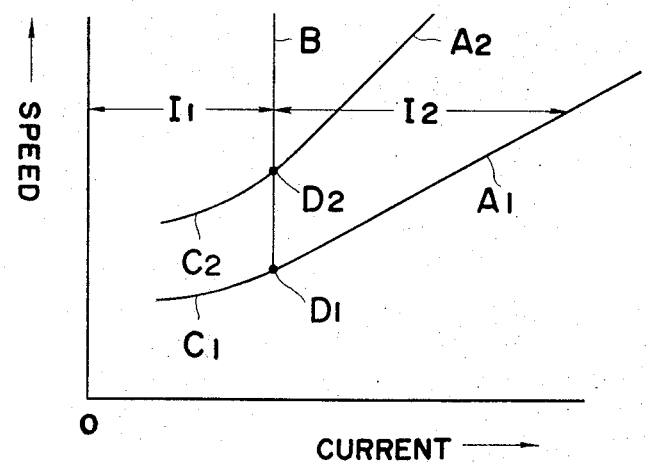
Figure 6:
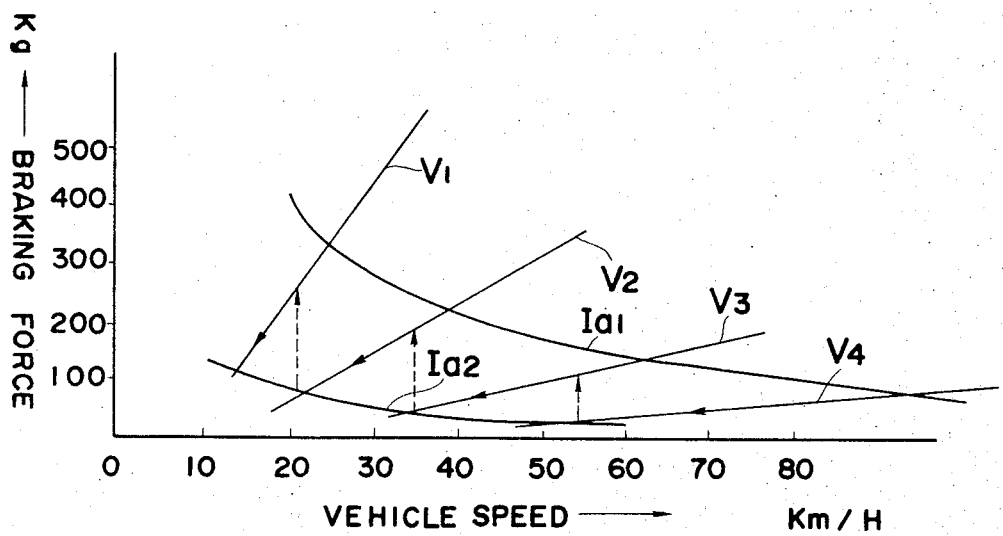
Figure 7:
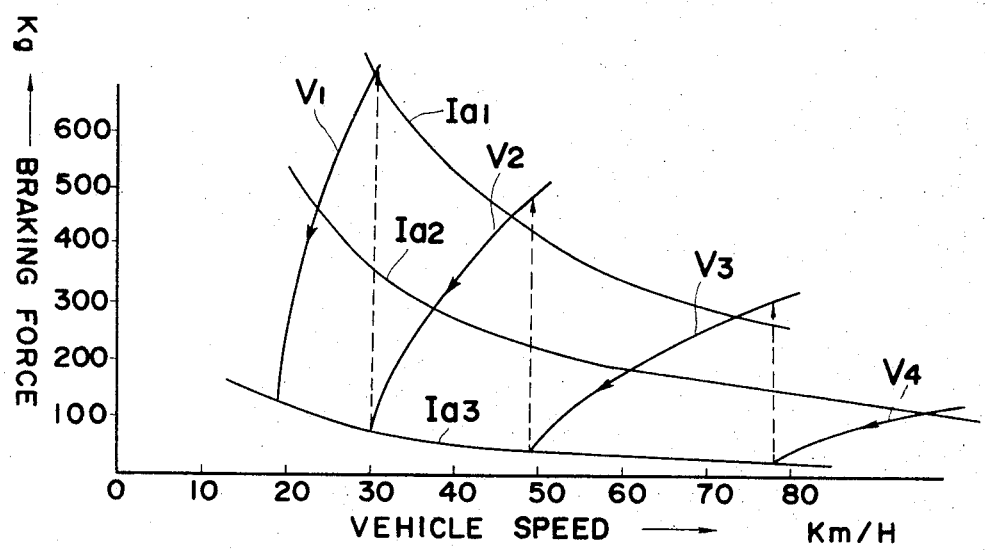
Figure 8:
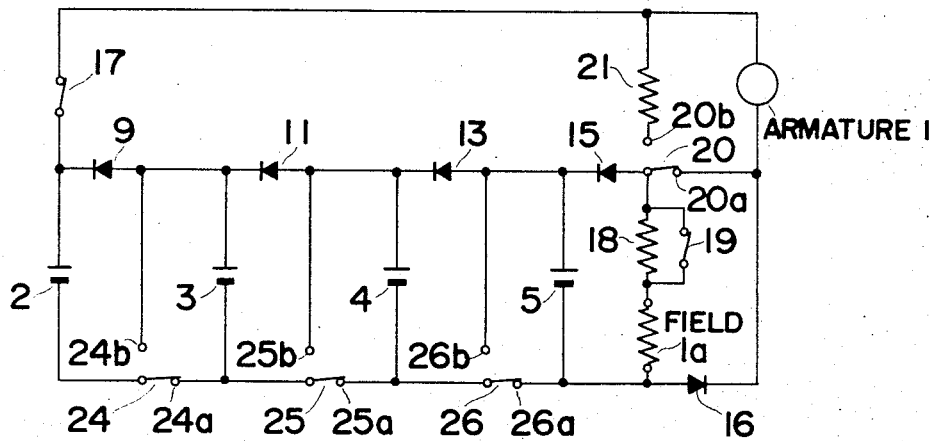

Other objects and advantages will be apparent from the following description of the preferred example of the invention, given for the purpose of disclosure and taken in conjunction with the drawings, where like character references designate like parts throughout the several figures, and where:

FIG. 1 is a wiring diagram of a control system constructed in accordance with the invention, FIGS. 2a–2e show each active circuit of FIG. 1 at respective motor speed, FIG. 3 is a speed-current characteristic curve of the motor shown in FIG. 2, FIG. 4 is a wiring circuit illustrative of a principle of regenerative braking operation, FIG. 5 is a speed-current characteristic curve of the motor shown in FIG. 4, FIG. 6 is a braking force-vehicle speed characteristic curve of the control system according to the invention, FIG. 7 is a braking force-vehicle speed characteristic of a conventional control system, and FIG. 8 is a wiring diagram of another embodiment of the invention.

Referring to FIG. 1, the armature of a D.C. motor M is indicated by the reference numeral 1 and the field winding of the motor M is indicated by the reference numeral 1a. Four batteries are designated by the reference numerals 2 to 5, while three switches are referenced by numerals 6 to 8. Uni-directional conductors, such as diodes are designated by the reference numerals 9 to 16, a circuit breaker by the reference numeral 17 and a starting resistor by the reference numeral 18. A switch 19 is employed for short-circuiting the resistor 18 and the movable contactor of a change-over switch 20 is disposed to contact one of two contacts 20a and 20b, the latter being connected to resistor 21.

Each switch 6 to 8 is inserted between each respective pair of adjacent batteries (2 to 5), so that each adjacent pair of batteries are connected in series with each other by closing one of the switches 6 to 8, respectively. The diodes 9 to 14 are provided for preventing back currents, and each is connected in parallel to respective batteries with opposite polarity thereof through respective switches. Namely, the diode 9 is connected in parallel with the battery 2 through the switch 6 with the polarity thereof opposite to that of the battery 2, and the diode 10 is connected in parallel with the battery 3 through the switch 6 with the polarity thereof opposite to that of the battery 3. Similarly, the diodes 11 and 12 are connected in parallel with the batteries 3, 4, respectively, through the switch 7 with the polarity thereof opposite to that of the batteries 3, 4, respectively, and the diodes 13 and 14 are connected in parallel with the batteries 4, 5, respectively, through the switch 8 with the polarity thereof opposite to that of the batteries 4, 5, respectively.

The motor control circuit constructed as shown in FIG. 1 provides five different speeds for the motor M.

When the motor M is to be driven, the switch 17 is closed and the movable contactor of the change-over switch 20 is closed to the contact 20a.

For the first speed of the motor M, the switches 6 to 8 and the switch 19 are all opened. Therefore, the batteries 2 to 5 are connected in a parallel circuit through the closed switch 17, the armature 1, the starting system 18 and the field winding 1a. The simplified active circuit for the first speed is shown in FIG. 2 (a). In this case, the battery voltage E is applied to the motor M through the resistor 18. The motor M thus operates at a first speed.

For the second speed of the motor M, the switch 19 is closed so that the resistor 18 is short circuited through the switch 19, and accordingly, the battery voltage E is directly applied to the motor M. The motor M thus operates at a second speed. The simplified active circuit is shown in FIG. 2 (b). For the third speed, the switch 7 is closed, so that the pair of batteries 2 and 3, which are in parallel with each other are connected in series with the pair of batteries 4 and 5, which are in parallel with each other. Then, the applied voltage to the motor M becomes 2E, and the speed of the motor M is accelerated up to twice the second speed. The simplified active circuit for the third speed is shown in FIG. 2 (c).

For the fourth speed of the motor M, either switch 6 or 8 is closed, so that one of the two pairs of batteries in parallel, for instance, the batteries 2 and 3, are connected in series with each other. Then, the applied voltage to the motor M becomes 3E. The motor M thus operates at a fourth speed. The simplified active circuit for the fourth speed is shown in FIG. 2 (d).

For the fifth speed of the motor M, one of the remaining switches 8 or 6 is closed, so that all four batteries 2 through 5 are connected in series. Then the voltage applied to the motor M becomes 4E. The motor M thus operates at a fifth speed.

Owing to the diodes 9 to 14, the switches for changing the series-parallel connection of the batteries 2 to 5 can be minimized. As explained above, the connection of the four batteries 2, 3, 4 and 5 can be changed by closing or opening merely three switches 6, 7 and 8. By changing the connection of the four batteries, the applied voltage to the motor M is changed in a multiplicity of stages, thereby controlling the motor speed. In addition to controlling the speed by changing the connection of the batteries, the speed control of the vehicle can be effected by changing the gear ratio of a change gear.

During the running operation of the motor M, diode 16 is always connected in parallel with the field winding 1a or in parallel with the series circuit of field winding 1a and resistor 18. However, since the polarity of the diode 16 is opposite to that of the voltage applied across the field winding 1a or across the field winding 1a and the resistor 18 connected in series, no current flows through the diode 16. On the other hand, the field winding 1a, in series with resistor 18, is connected in parallel with the battery 5 through the diode 15. However, since the output voltage of the batteries 2 to 5 is higher than the voltage drop in the series connected circuit of the field winding 1a and the resistor 18 at a normal running state, no current flows through the diode 15.

For the braking operation of the control circuit shown in FIG. 1, the arm of switch 20 is changed over to the contact 20b while the circuit breaker 17 and the short circuiting switch 19 are opened. In this state, the circuit formed through the breaking resistor 21, the starting resistor 18 and the field winding 1a is connected in parallel with the armature 1. In this case, the batteries 2 to 5 are connected in parallel by opening the switches 6 to 8. The batteries 2 to 5 thus connected in parallel are also connected in parallel with the series circuit comprising the field winding 1a and the resistor 18.

The equivalent circuit for the control circuit of FIG. 1 in the state above described, is shown in FIG. 4. Referring to FIG. 4, when a current flows through the field winding 1a in the direction as indicated by an arrow 22, an electro-motive force is induced in the armature 1 with a polarity shown by an arrow 23, since the direction of the current I1 is the same with that of the current that flows through the winding 1a during running state of the motor M. This electro-motive force supplies current I1 to the field winding 1a as well as charging current $I_2$ to the batteries 2 to 5 through the diode 15.

As a battery is substantially a constant voltage source, and also develops substantially a constant voltage during its charging period the batteries 2 to 5 develop substantially a constant voltage so far as the charging I2 is supplied, so that the potential at a point a shown in FIG. 4 is constant during the charging period. Accordingly, the current I1, supplied to the winding 1a through the resistor 18, is constant. Thus, the motor M operates as an externally excited shunt generator during braking. When the speed of the motor M is decreased so that the potential at the point a is lower than that of the batteries 2 to 5, then the charging current I2 ceases to flow, and the batteries 2 to 5 are cut off from the point a by means of the diode 15. In this state, the motor M performs dynamic braking as a series generator.

Namely, within a motor speed range where the motor M operates an an externally excited shunt generator, most of the generated current is used for charging the batteries 2 to 5, and the remaining part of the generated current, that is, a constant current in this case, flows through the field winding 1a. In this case, most of the generated electric energy is stored in the batteries 2 to 5, whereby regenerative braking is performed, and also partly consumed as resistance losses in the braking resistor 21, the starting resistor 18 and the field winding 1a, so that further braking is performed. Within this motor speed range, the braking torque is proportional to the armature current since the filed current is constant. Thus, due to the provision of the unidirectional device comprising the diodes 9–14, for connecting the movable contactor 20 to one polarity of the batteries 2–5 in such a manner that the unique directional device permits current flow from the movable contactor 20 to the one polarity of the batteries 2–5, the number of contactors (switches 6–8) for changing the operation of the motor M is diminished (or lessened). Furthermore, the induction of an unnecessarily large electromotive force at the early portion of deceleration for the D.C. motor for charging the batteries 2–5, is prevented, since the field winding 1a is connected in parallel with the batteries 2 to 5, so that the field winding 1a provides a constant exciting current. The armature current is proportional to the motor speed as shown in FIG. 5. A straight line B represents the substantially constant field current I1, which is independent of the motor speed, and the difference between straight lines A1 and B defines the charging current I2. A curve C1 is a speed-current characteristic within the low speed range of the motor M where it operates as a series generator. The converting point, where the motor M is converted form a shunt generator to a series generator, is indicated by D1. The point D1 is transferred upwardly to point D2 by increasing the resistance of the braking resistor 18, and accordingly, the characteristic is varied as indicated by a straight line A2 and a curve C2.

FIG. 6 shows a vehicle speed braking force characteristic during regenerative braking by the control device of the invention. Curves Ia1 and Ia2 respectively indicate equi-current curves at 300 A and 100A. Four straight lines V1 to V4, respectively, indicate braking forces at four steps of a change gear. The gear ratio for V1 is larger than that for V2, and that for V2 larger than that for V3. The braking force is proportional to the speed of the vehicle. In the case where the vehicle speed is for example 70km/H, braking is started at the smallest gear ratio, for example, at the gear ratio 1, then the braking forces varies along the curve V4. When the gear ratio is changed at the vehicle speed of about 55km/H to transfer the characteristic to the curve V3, the braking current is increased up to about 230A from 100 A. Similarly, when the gear ratio is again changed to transfer the characteristic to the curve V2 at the time when the braking current is decreased along the curve V3 to 100 A, the braking current increases to about 230A, and then decreases along the curve V2. Similarly, change over of the gear ratio is performed to transfer to the curve V1 from curve V2, and then the current decreases along the curve V1. When the current is decreased to 100 A along the curve V1, the speed of the vehicle is lowered to 13km/H.

Through the changing process of the gear ratio, the ratio of the minimum current 100 A to the maximum current 230A is 2.3 and the variation of the braking force at the time of change over of the gear ratio is relatively small. In the case where the field current is set at 100 A by adjusting the resistance values of the resistors 21 and 18, the part of the braking current exceeding 100A is utilized for charging the batteries.

The braking force- vehicle speed characteristic shown in FIG. 7 is that of a conventional speed control system where only a braking resistor of 0.7 ohm is connected in the control circuit of a motor which is similar to that used in the invention. There are shown, as in FIG. 6, the characteristic curves V1 to V4 at each four gear ratio. As seen from the characteristic curves V1 to V4, the braking force varies more steeply, compared to that of in FIG. 6 in accordance with the variation of the speed of the vehicle. Ia1 , Ia2 and Ia3 are the equi-current curves at 300A, 220A and 100A, respectively. When the gear ratio is changed at the time when the braking current decreased to 100A along respective curve V1 to V4, the braking current increases up to about 320A, and the rate of variation of the braking force at the time of change over of the gear ratio is high.

Referring to FIG. 8, the reference numerals 24 to 26 denote change over switches, respectively, each having two contacts 24a, 24b, to 26a, 26b.

When the motor M is to be driven, the switch 17 is closed and the change over switch 20 is closed to the contact 20a.

For the first speed of the motor M, the switches 24, 25 and 26 are closed to the contacts 24a, 25a and 26a, respectively, with the switch 19 opened. In this state, all the batteries 2 to 5 are connected in parallel.

For the second speed, the switch 19 is closed.

For the third speed, the switch 25 is changed over to the contact 25b. Then the batteries 2 and 3, in parallel with each other, are connected in series with the batteries 4 and 5, which are in parallel with each other. For the fourth speed, the switch 24 (or 26) is further changed over to the contact 24b (or 26b). In this state, the batteries 2 and 3 are connected in series, and this circuit formed through the batteries 2 and 3 is connected in series with the batteries 4 and 5, which are in parallel with each other.

For the fifth speed, the remaining switch 26 (or 24) is further changed over to the contact 26b (or 24b). In this state, all four batteries 2 to 5 are connected in series. The applied voltage to the motor M for each speed is the same as described in connection with FIG. 1.

As described above, the control circuit of the present invention is simple in construction, and can provide three steps of voltage, i.e. 1E, 2E and 3E, while all the batteries discharge equally.

Further, a voltage of 3E can be provided, if necessary, by closing one of the switches 6 and 8 with the switch 7 closed, while all the batteries discharge equally.

Further, the motor current is not interrupted during the change of the connection of batteries in series or in parallel, since the control circuit is constructed with uni-directional devices.

The control circuit can also charge the four batteries connected together in parallel during regenerative braking, so that the voltage across the field winding does not exceed over 1E. Accordingly, the feeling of driving is not damaged since an abnormal braking force is prevented, and also a danger of a rear-end collision is prevented. Moreover, generation of an abnormal high current, which may destroy the batteries, is prevented, and the batteries can be charged until the speed of the vehicle is decreased to a low speed during the decelerating operation.

On the other hand, the control device of the invention is simple in construction, and the number of change over contactors is minimized, resulting in the high stability of the device and in the diminished operation for maintenance.

According to the control device of the invention, the rate of increase of the motor current and the rate of increase of the braking force are less than those in a conventional device, and thus provide the desired smoothness of braking operation.

Further, as regenerative braking is performed by charging the batteries through unidirectional devices, and at least dynamic braking is performed, even when regenerative braking ceases due to the slowing down of the motor or the vehicle, the braking force is not absent even under the low speed of the motor.

The motor has a characteristic of an externally excited shunt generator during regenerative braking; therefore, the ranges of variation of motor current and braking force by the changing of the gear ratio are small and a relatively smooth braking operation can be performed.

What I claim is:

1. A control system for an electric vehicle comprising,
   a D.C. motor having an armature and a field winding,
   a first battery, a second battery, a third battery and a fourth battery,
   a normally open switch means adapted to be closed in normal operation of said motor for connecting said batteries in parallel to a series circuit through said armature and said field winding to apply a first voltage thereto,
   a first switching means, for connecting said first and second batteries in series, a second switching means for connecting the pair of said first and second batteries, connected in parallel, in series to the pair of said third and fourth batteries, connected in parallel, to apply a second voltage to said armature and said field winding, a third switching means for connecting said third and fourth batteries in series, said three switching means in their closed positions connecting said batteries in series to apply a third voltage to said armature and said field winding,
   each two of said batteries adjoining to each other being connected in parallel through two uni-directional devices with said switching means opened,
   each said uni-directional device being connected, through one of said switching means in its closed position, in series to one of said batteries respectively with the opposite polarity thereof to prevent the short circuiting of said batteries,
   said normally open switch means being connected to one polarity of said batteries and being opened in decelerating operation of the motor,
   a switching device having a first contact point, a second contact point and a movable contactor, said movable contactor being connected to the first contact point in normal operation of the motor and to the second contact point in decelerating operation of the vehicle, said armature being connected to said batteries at one end through said normally open first switch in its closed position and connected to said first contact point at the other end, said field winding connected to the movable contactor at one end and to the other polarity of said batteries at the other end,
   a first resistor connected in series with said field winding between the movable contactor and the other polarity of said batteries, second resistor connected between said second contact point and the one end of said armature,
   a uni-directional device for connecting the movable contactor to one polarity of said batteries with such a polarity that current flows from said movable contactor to the one polarity of said batteries, and
   means for interrupting current to flow from said armature to the other polarity of said batteries in normal operation of the vehicle and permitting the current to flow from the other polarity of said batteries to the other end of said armature in decelerating operation of the vehicle, said means connecting the other polarity of said first battery with the other end of said armature, wherein said batteries are charged in parallel during decelerating operation of said vehicle.

2. A control system for an electric vehicle comprising a D.C. source, a normally open switch, connected to one polarity of said D.C. source, for closing in normal operation of the vehicle and opening in decelerating operation of a vehicle, a switching device having a first contact point, a second contact point and a movable contactor, said contactor being connected to the first contact point in normal operation of the vehicle and to the second contact point in decelerating operation of the vehicle, a D.C. motor having an armature and a field winding, said armature being connected to said D.C. source at one end through said normally open switch in its closed position and to the first contact point at the other end, said field winding being connected to the movable contactor at one end and to the other polarity of said D.C. source at the other end, a first resistor connected in series with said field winding between the movable contactor and the other polarity of said D.C. source, a second resistor connected between the second contact point and the one end of said armature, a uni-directional device connecting the movable contactor to the one polarity of said D.C. source with such a polarity that current flows from the movable contactor to the one polarity of the D.C. source, and means for interrupting current to flow from said armature to the other polarity of said D.C. source in normal operation of the vehicle and permitting the current to flow from the other polarity of said D.C. source to the other end of said armature in decelerating operation of the vehicle, said means connecting the other polarity of said D.C. source with the other end of said armature.

3. A control system for an electric vehicle in claim 2, wherein said means is a uni-directional device which permits current to flow through said field winding to the other end of said armature.

* * * * *